(12) United States Patent
Wuisan et al.

(10) Patent No.: US 12,209,389 B2
(45) Date of Patent: Jan. 28, 2025

(54) WORK VEHICLE HAVING A WORK IMPLEMENT AND SENSORS FOR MAINTAINING A VIEW OF AN AREA OF INTEREST THROUGHOUT MOVEMENT OF THE WORK IMPLEMENT

(71) Applicant: Deere & Company, Moline, IL (US)

(72) Inventors: Giovanni A. Wuisan, Epworth, IA (US); Rachel Bruflodt, Dubuque, IA (US); Brett S. Graham, Dubuque, IA (US)

(73) Assignee: Deere & Company, Moline, IL (US)

( * ) Notice: Subject to any disclaimer, the term of this patent is extended or adjusted under 35 U.S.C. 154(b) by 332 days.

(21) Appl. No.: 17/686,851

(22) Filed: Mar. 4, 2022

(65) Prior Publication Data

US 2023/0279644 A1 Sep. 7, 2023

(51) Int. Cl.
| | |
|---|---|
| *E02F 9/26* | (2006.01) |
| *B60R 1/00* | (2022.01) |
| *B60R 1/25* | (2022.01) |
| *B60R 1/28* | (2022.01) |
| *B60R 11/00* | (2006.01) |
| *B60R 11/04* | (2006.01) |

(Continued)

(52) U.S. Cl.
CPC .............. *E02F 9/261* (2013.01); *B60R 1/002* (2013.01); *B60R 1/25* (2022.01); *B60R 1/28* (2022.01); *B60R 11/04* (2013.01); *E02F 9/264* (2013.01); *G06V 10/25* (2022.01); *G06V 20/56* (2022.01); *B60R 2011/004* (2013.01); *B60R 2300/605* (2013.01); *B60R 2300/607* (2013.01)

(58) Field of Classification Search
CPC . E02F 9/261; E02F 9/264; E02F 3/431; E02F 3/3414; E02F 9/205; E02F 9/267; B60R 1/002; B60R 1/25; B60R 1/28; B60R 11/04; B60R 2011/004; B60R 2300/605; B60R 2300/607; B60R 1/00; G06V 10/25; G06V 20/56; G06V 10/26
See application file for complete search history.

(56) References Cited

U.S. PATENT DOCUMENTS

| | | |
|---|---|---|
| 9,712,791 B2 | 7/2017 | Kim et al. |
| 9,908,385 B2 | 3/2018 | Chundrlik, Jr. et al. |
| 10,086,761 B2 | 10/2018 | Kröll et al. |

(Continued)

OTHER PUBLICATIONS

Vehicle Video Cameras, Forklift HD Industrial Operator Safety Camera System, 2021, vehiclevideocameras.com, pp. 9 (Year: 2021).*

*Primary Examiner* — Aniss Chad
*Assistant Examiner* — Chase L Cooley
(74) *Attorney, Agent, or Firm* — Gary L. Montle; Lucian Wayne Beavers; Patterson Intellectual Property Law, PC

(57) ABSTRACT

A work vehicle is provided with a first portion having a frame supported by ground engaging units, and an operator cab with a first (forward) side and opposing second and third sides having respective (i.e., left and right) fields of view. At least a first portion of terrain proximate to the frame (i.e., an area of interest) is obscured from view of an operator in the operator cab during at least a portion of a trajectory of movement of a second portion of the work vehicle (e.g., a boom assembly). At least one imaging device is mounted on the work vehicle and has a field of view including the area of interest throughout the trajectory of movement of the second portion.

17 Claims, 5 Drawing Sheets

(51) Int. Cl.
  *G06V 10/25*   (2022.01)
  *G06V 20/56*   (2022.01)

(56) References Cited

U.S. PATENT DOCUMENTS

| | | |
|---|---|---|
| 10,144,353 B2 | 12/2018 | Karner et al. |
| 10,377,311 B2 | 8/2019 | Kröll et al. |
| 10,378,162 B2 | 8/2019 | Kröll et al. |
| 10,458,098 B2 | 10/2019 | Baeumchen |
| 10,479,354 B2 | 11/2019 | Posselius et al. |
| 11,155,210 B2 | 10/2021 | Karner et al. |
| 2008/0309784 A1 | 12/2008 | Asari et al. |
| 2009/0022423 A1 | 1/2009 | Ehlgen et al. |
| 2012/0127310 A1 | 5/2012 | Kim |
| 2014/0204215 A1 | 7/2014 | Kriel et al. |
| 2014/0247352 A1 | 9/2014 | Rathi et al. |
| 2014/0267731 A1 | 9/2014 | Izumikawa |
| 2015/0009329 A1 | 1/2015 | Ishimoto |
| 2015/0070498 A1 | 3/2015 | Kriel |
| 2016/0138248 A1 | 5/2016 | Conway et al. |
| 2017/0037586 A1* | 2/2017 | Kröll ............ E01C 23/127 |
| 2017/0073935 A1* | 3/2017 | Friend ............ E02F 9/265 |
| 2017/0131722 A1 | 5/2017 | Hiramatsu et al. |
| 2017/0135277 A1 | 5/2017 | Hiramatsu et al. |
| 2018/0035050 A1 | 2/2018 | Lu et al. |
| 2019/0078292 A1 | 3/2019 | Ono |
| 2020/0181880 A1 | 6/2020 | Meyer et al. |
| 2023/0011758 A1* | 1/2023 | Okajima ............ B60Q 9/008 |
| 2023/0323637 A1* | 10/2023 | Eguchi ............ E02F 9/261 |
| | | 345/173 |
| 2023/0349133 A1* | 11/2023 | Snyder ............ E02F 9/2808 |

\* cited by examiner

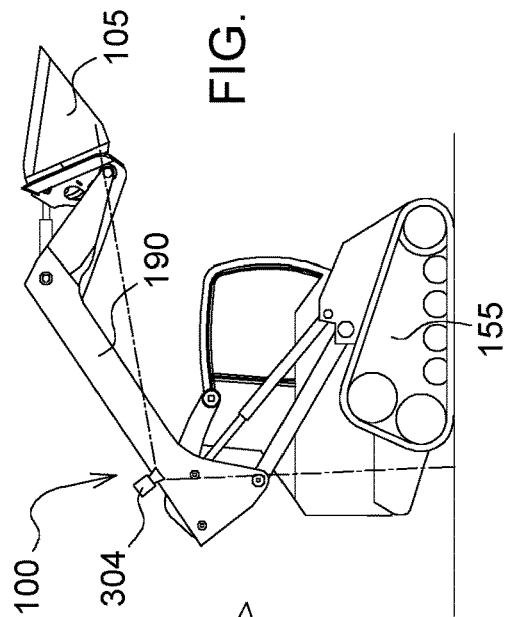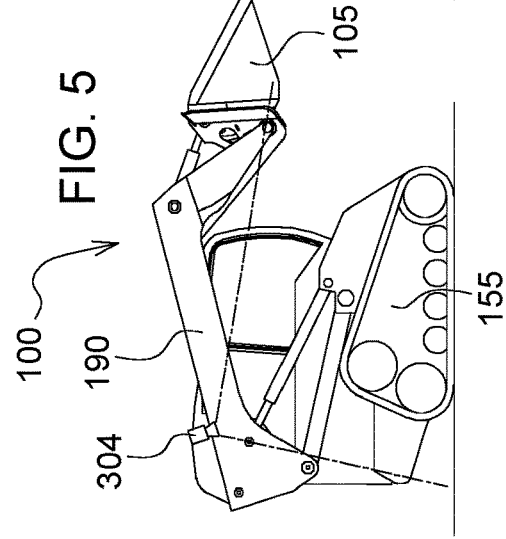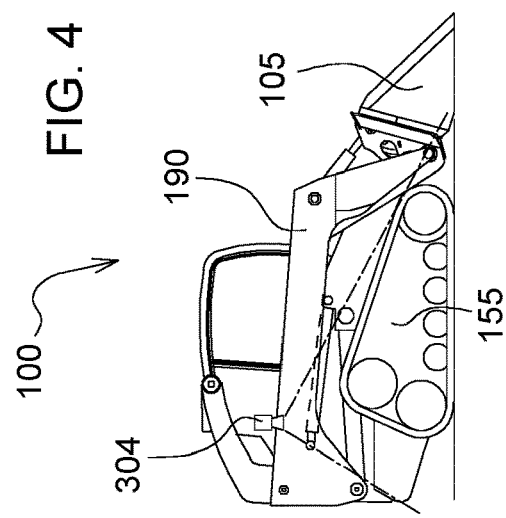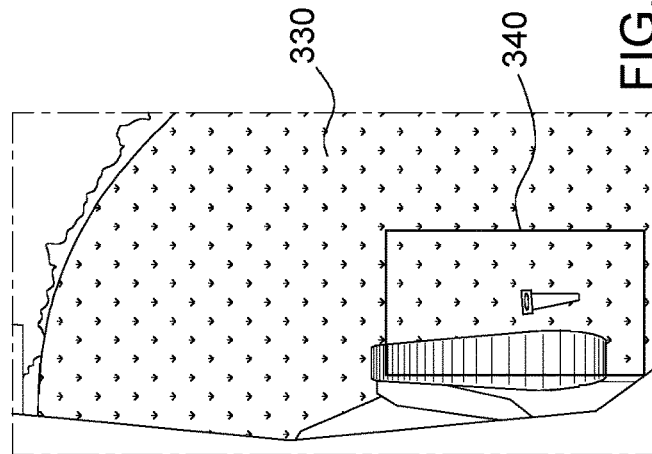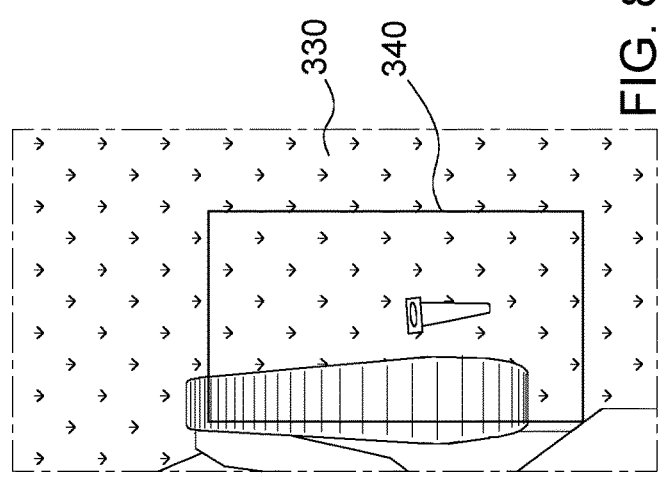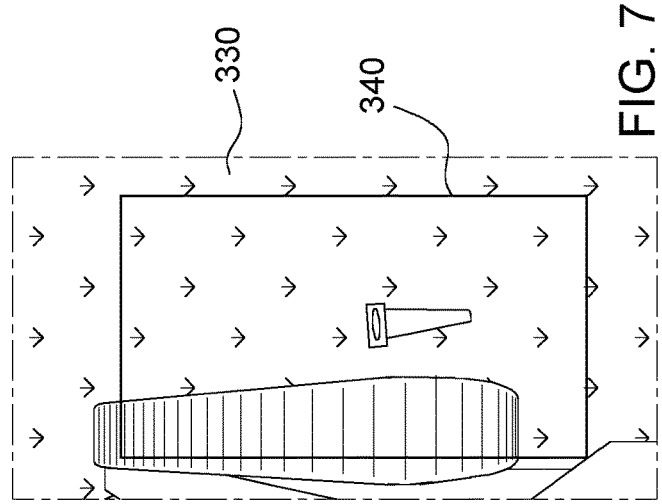

WORK VEHICLE HAVING A WORK IMPLEMENT AND SENSORS FOR MAINTAINING A VIEW OF AN AREA OF INTEREST THROUGHOUT MOVEMENT OF THE WORK IMPLEMENT

FIELD OF THE DISCLOSURE

The present disclosure relates to self-propelled work vehicles configured to provide improved operational awareness for human operators thereof. More particularly, the present disclosure relates to systems and methods for automatically maintaining a field of view including an area of interest relative to the work vehicle regardless of the position of a moveable implement or other vehicle portion relative to a main frame of the work vehicle.

BACKGROUND

Work vehicles as discussed herein relate primarily to skid steer loaders and compact track loaders for reasons as further described below, but may in various embodiments apply as well to other work vehicles having boom assemblies or an equivalent thereof which are moved during operation to modify the terrain or equivalent working environment in some way, and more particularly which at least partially obscure a field of view for an operator during said movements.

There is an ongoing need in the field of such work vehicles for solutions that provide better operational awareness for the operator. One problem for the operator is that even in ideal circumstances the surroundings of the work vehicle can only be seen to a limited extent from the operator cab, and at various times throughout a trajectory of movement for a portion of the work vehicle such as for example a pivoting, telescoping, or articulating work implement (e.g., boom assembly) the operator's field of view of the terrain to the sides of the work vehicle may be almost entirely obscured. While this may not be problematic for certain work vehicles, skid steer loaders and compact track loaders are primary examples of a work vehicle wherein at least part of the boom assembly traverses what otherwise would be the field of view of for an operator to either side of the work vehicle with respect to a traveling direction thereof. Consequently, the operator may be unable to sufficiently identify external objects from a typical working position that are concealed by the work implement in his field of vision.

One potential solution for this problem could be an imaging device mounted to an arm which extends high above the work vehicle, but for various reasons this may be deemed an impractical solution in a working environment.

BRIEF SUMMARY OF THE DISCLOSURE

The current disclosure provides an enhancement to conventional systems, at least in part by mounting a detection system (i.e., including one or more imaging devices such as cameras, lidar sensors, and the like) in association with the work vehicle in such a manner that a field of view for a predetermined area of interest to one or more sides of the work vehicle is maintained throughout a trajectory of movement for a work implement (e.g., a boom assembly) mounted thereto.

According to a first embodiment of a work vehicle as disclosed herein, a first portion comprising a frame is supported by a plurality of ground engaging units and includes an operator cab supported by the frame and having a first side having a forward field of view and opposing second and third sides having respective lateral fields of view. A second portion of the work vehicle is moveable relative to the first portion, wherein a predetermined area of interest corresponding to at least a first portion of terrain relative to the frame is obscured via one or more of the forward field of view and/or the lateral fields of view during at least part of a trajectory of movement of the second portion. However, an imaging device is mounted on the work vehicle and provides a field of view including the at least first portion of the terrain throughout the trajectory of movement of the second portion of the work vehicle.

In a second embodiment, exemplary aspects according to the above-referenced first embodiment may include that second portion comprises a boom assembly supported by the frame and configured to selectively move a working tool at a distal end thereof between a ground engaging position and a maximum elevated position at opposing ends of the trajectory of movement, and that the imaging device is mounted on the machine frame in a location rearward of the operator cab in a fore-aft direction of the work vehicle.

In a third embodiment, another exemplary aspect according to the above-referenced first embodiment may include that the imaging device is mounted on the second portion and moves relative to the frame and to the terrain along with the trajectory of movement of the second portion. The second portion may for example include a work implement supported by the frame and configured to selectively move a working tool at a distal end thereof between a ground engaging position and a maximum elevated position at opposing ends of the trajectory of movement. Such a work implement may for example include a boom assembly, wherein the imaging device is mounted on the boom assembly and moves relative to the frame and to the terrain along with the trajectory of movement of the boom assembly. In one alternative embodiment wherein the work vehicle comprises an excavator, the at least first portion of terrain proximate to the frame is obscured via the forward field of view from the operator cab by the boom assembly during at least a portion of the trajectory of movement of the boom assembly.

In a fourth embodiment, other exemplary aspects according to the above-referenced third embodiment may further include a processing unit (e.g., embodied by or otherwise including a vehicle controller) in functional communication with the imaging device to receive image data therefrom, wherein the controller is configured to generate output signals corresponding to images of the at least first portion of the terrain to a display unit, which may for example be located in the operator cab.

The controller may for example be configured to process the image data and generate the output signals for producing an image comprising a top down view (which also may be referred to as a so-called "bird's eye view") of the at least first portion of the terrain.

In a fifth embodiment, other exemplary aspects according to the above-referenced fourth embodiment may include that the controller is configured to dynamically process the image data, wherein image display parameters associated with the at least first portion of the terrain are maintained throughout the trajectory of movement of the second portion of the work vehicle.

The controller may for example be configured to dynamically process the image data based on a current position of the imaging device along the trajectory of movement of the second portion of the work vehicle.

In other exemplary aspects according to the fifth embodiment, the work vehicle may further comprise one or more kinematic sensors located on the work vehicle and linked to the controller, wherein the controller is configured to determine the current position of the imaging device in a local reference system via at least signals from the one or more kinematic sensors.

The one or more kinematic sensors may for example be integrated in the imaging device.

The one or more kinematic sensors may comprise a first position sensor mounted on the first portion of the work vehicle and a second position sensor mounted on the second portion of the work vehicle.

In a sixth embodiment, other exemplary aspects according to the above-referenced fifth embodiment may include that the dynamic processing of the image data comprises dynamic cropping of the image data from the field of view of the imaging device and with respect to the at least first portion of the terrain.

The dynamic cropping of the image data in accordance with the sixth embodiment may be achieved at least in part via retrieval and implementation of one or more models corresponding to a current position of the imaging device along the trajectory of movement of the second portion of the work vehicle.

The work vehicle according to the sixth embodiment may comprise one or more kinematic sensors located on the work vehicle and linked to the controller, wherein the controller is configured to determine the current position of the imaging device in a local reference system via at least signals from the one or more kinematic sensors.

The one or more kinematic sensors may be integrated with the imaging device.

The one or more vehicle kinematic sensors may comprise a first position sensor mounted on the first portion of the work vehicle and a second position sensor mounted on the second portion of the work vehicle.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

FIG. 4 is a side view representing an exemplary work vehicle according to the embodiment of FIG. 1, with the boom assembly in a lowered position.

FIG. 5 is a side view representing an exemplary work vehicle according to the embodiment of FIG. 1, with the boom assembly in an intermediate position along a trajectory of available movement thereof.

FIG. 6 is a side view representing an exemplary work vehicle according to the embodiment of FIG. 1, with the boom assembly in a raised position.

FIG. 7 is an overhead schematic view representing an exemplary top down view of an area of interest corresponding to terrain proximate the exemplary work vehicle according to the embodiment of FIG. 1, with the boom assembly in the lowered position as represented in FIG. 4.

FIG. 8 is an overhead schematic view representing an exemplary top down view of an area of interest corresponding to terrain proximate the exemplary work vehicle according to the embodiment of FIG. 1, with the boom assembly in the intermediate position as represented in FIG. 5.

FIG. 9 is an overhead schematic view representing an exemplary top down view of an area of interest corresponding to terrain proximate the exemplary work vehicle according to the embodiment of FIG. 1, with the boom assembly in the raised position as represented in FIG. 6.

DETAILED DESCRIPTION

Figure 1:
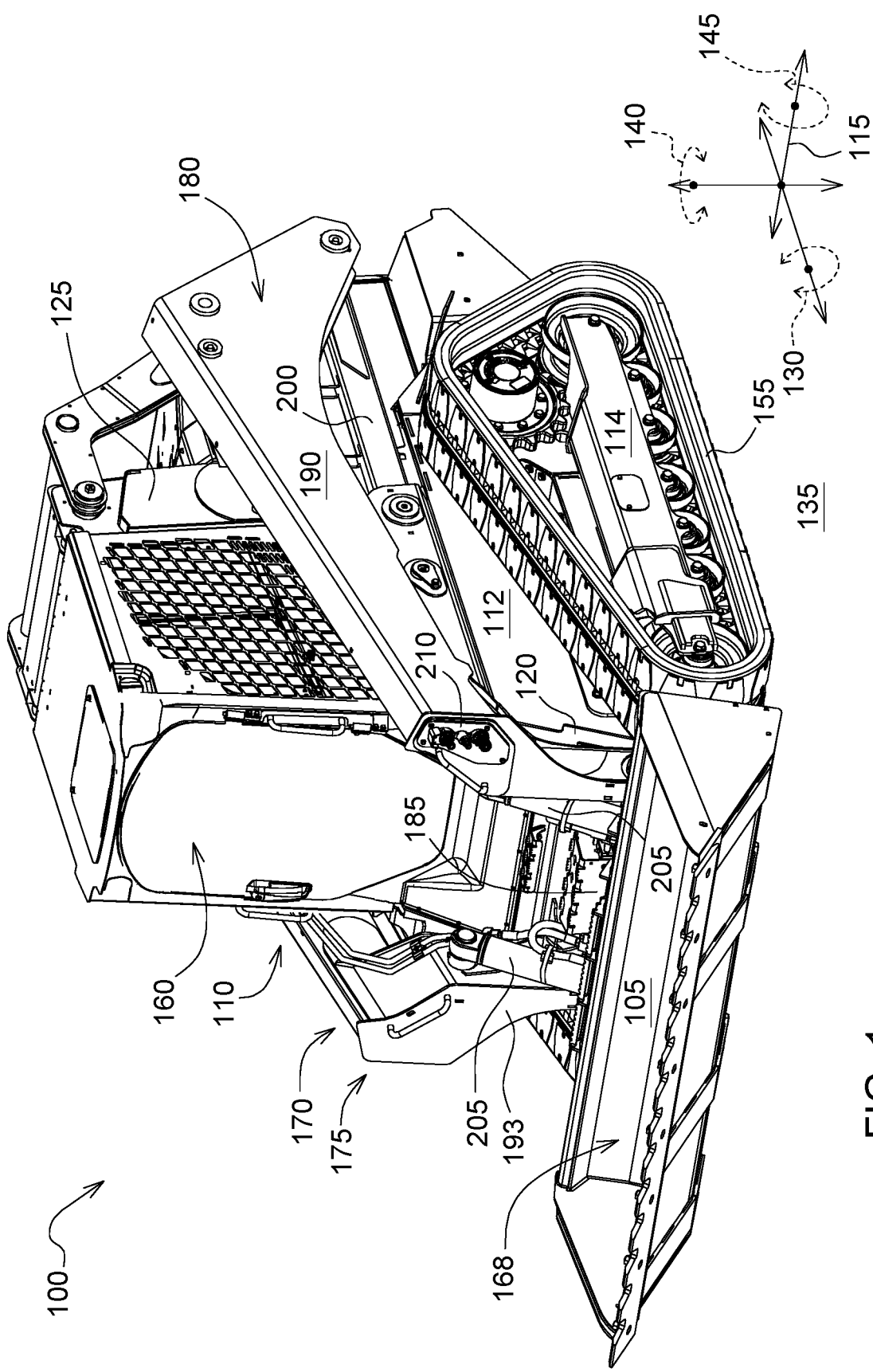
FIG. 1 is a perspective view of an embodiment of a skid-steer loader as a work vehicle according to the present disclosure.

Referring now to the drawings and particularly to FIG. 1, a representative work vehicle is shown and generally designated by the number 100. FIG. 1 shows a compact track loader, but it may be understood that the work vehicle 100 could be one of many types of work vehicles, including, and without limitation, a skid steer loader, a backhoe loader, a front loader, a bulldozer, and other construction vehicles, having distinctions in their respective components with respect to the compact track loader and as may be appreciate by one of skill in the art. The work vehicle 100, as shown, has a frame 110 extending in a fore-aft direction 115 with a front-end section 120 and a rear-end section 125. The work vehicle includes a ground-engaging mechanism 155 that supports the frame 110 and an operator cab 160 supported on the frame 110, wherein the ground-engaging mechanism 155 is configured to support the frame 110 on a surface 135.

An engine 165 (not shown) is coupled to the frame 110 and is operable to move the work vehicle 100. The illustrated work vehicle includes tracks, but other embodiments can include one or more wheels that engage the surface 135. The work vehicle 100 may be operated to engage the surface 135 and cut and move material to achieve simple or complex features on the surface. As used herein, directions with regard to work vehicle 100 may be referred to from the perspective of an operator seated within the operator cab 160; the left of work vehicle 100 is to the left of such an operator, the right of work vehicle is to the right of such an operator, the front or fore of work vehicle is the direction such an operator faces, the rear or aft of work vehicle is behind such an operator, the top of work vehicle is above such an operator, and the bottom of work vehicle below such an operator. In order to turn, the ground-engaging mechanism 155 on the left side of the work vehicle may be operated at a different speed, or in a different direction, from the ground-engaging mechanism 155 on the right side of the work vehicle 100. In a conventional compact track loader, the operator can manipulate controls from inside an operator cab 160 to drive the tracks on the right or left side of the work vehicle 100. Rotation for work vehicle may be referred to as roll 130 or the roll direction, pitch 145 or the pitch direction, and yaw 140 or the yaw direction.

The work vehicle 100 comprises a boom assembly 170 coupled to the frame 110. An attachment 105, or work tool, may be pivotally coupled at a forward portion 175 of the boom assembly 170, while a rear portion 180 of the boom assembly 170 is pivotally coupled to the frame 110. The frame 110 as represented comprises a main frame 112 and a track frame 114. The attachment 105 is illustrated as a bucket, but may further or alternatively be any number of work tools such as a blade, forks, an auger, a drill, or a hammer, just to name a few possibilities. The attachment 105 may be coupled to the boom assembly 170 through an attachment coupler 185 which may be coupled to a distal section of the lift arms 190, or more specifically a portion of the boom arms in the forward portion 175 of the boom assembly 170.

The boom assembly 170 comprises a first pair of lift arms 190 pivotally coupled to the frame 110 (one each on a left side and a right side of the operator cab 160) and moveable relative to the frame 110 by a pair of first hydraulic cylinders 200, wherein the pair of first hydraulic cylinders 200 may also conventionally be referred to as a pair of lift cylinders (one coupled to each boom arm) for a compact track loader. The attachment coupler 185 may be coupled to a forward section 193 of the pair of lift arms 190, being moveable relative to the frame 110 by a pair of second hydraulic cylinders 205, which may be referred to as tilt cylinders for a compact track loader. The frame 110 of the work vehicle 100 further comprises a hydraulic coupler 210 on the front-end portion 120 of the work vehicle 100 to couple one or more auxiliary hydraulic cylinders (not shown) to drive movement of or actuate auxiliary functions of an attachment 105. The attachment coupler 185 enables the mechanical coupling of the attachment 105 to the frame 110. The hydraulic coupler 210, contrary to the attachment coupler 185, enables the hydraulic coupling of an auxiliary hydraulic cylinder(s) on the attachment 105 to the hydraulic (implement control) system 326 (see FIG. 3) of the work vehicle 100. It may be understood that not all attachments will have one or more auxiliary hydraulic cylinders and therefore may not use the hydraulic coupler 210. In the configuration represented in FIG. 1, wherein a bucket 168 is coupled to a compact track loader, the bucket does not use the hydraulic coupler or have auxiliary hydraulic cylinders. Alternatively, for example, the hydraulic coupler 210 may open or close a grapple type attachment, or spin a roller brush type attachment.

Each of the pair of first hydraulic cylinders 200, the pair of second hydraulic cylinders 205, and any auxiliary cylinders if applicable when found on the attachment 105 may be double acting hydraulic cylinders. One end of each cylinder may be referred to as a head end, and the end of each cylinder opposite the head end may be referred to as a rod end. Each of the head end and the rod end may be fixedly coupled to another component, such as a pin-bushing or pin-bearing coupling, to name but two examples of pivotal connections. As a double acting hydraulic cylinder, each may exert a force in the extending or retracting direction. Directing pressurized hydraulic fluid into a head chamber of the cylinders will tend to exert a force in the extending direction, while directing pressurized hydraulic fluid into a rod chamber of the cylinders will tend to exert a force in the retracting direction. The head chamber and the rod chamber may both be located within a barrel of the hydraulic cylinder, and may both be part of a larger cavity which is separated by a moveable piston connected to a rod of the hydraulic cylinder. The volumes of each of the head chamber and the rod chamber change with movement of the piston, while movement of the piston results in extension or retraction of the hydraulic cylinder.

For a work vehicle 100 as represented in FIG. 1, and further in view of the different potential positions of the boom assembly 170 and more particularly the lift arms 190 thereof throughout an available trajectory of movement (see, e.g., FIGS. 4-6), it may be understood that the boom assembly 170 at least partially obscures a lateral field of view from an operator when seated in the operator cab 160 during various portions of the available trajectory of movement.

Figure 2:
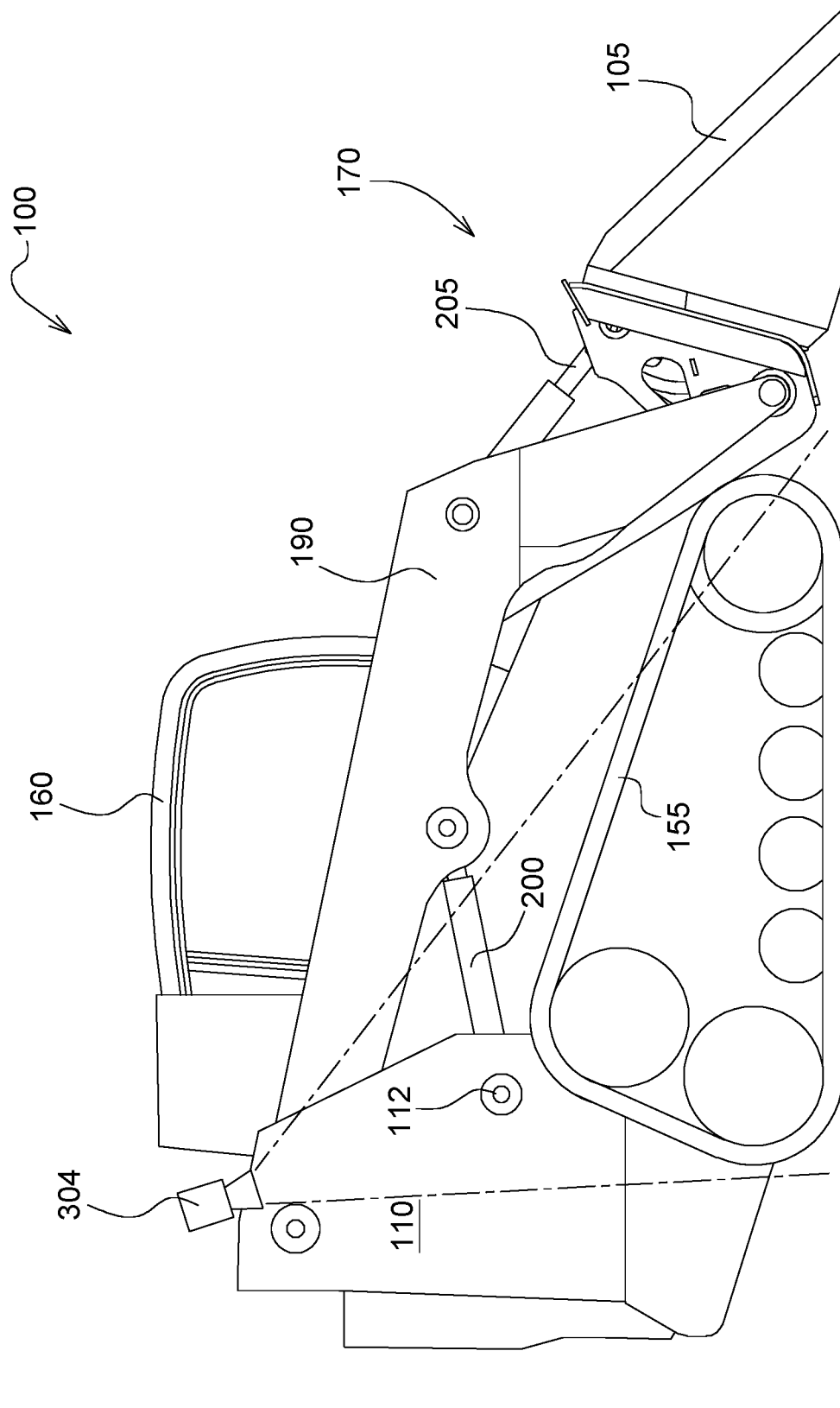
FIG. 2 is a side view representing another embodiment of a skid-steer loader as a work vehicle according to the present disclosure.

FIG. 2 represents a variant work vehicle 100 with respect to the embodiment of FIG. 1, at least in that a rear portion of the frame 110 forms an elevated pedestal (or tower) upon which an imaging device 304 may be directly mounted in accordance with the present disclosure and oriented to provide a field of view to the respective side of the work vehicle 100 that is not obscured throughout the available trajectory of movement of the boom assembly 170. While a location more central to the work vehicle 100, e.g., in line with the operator cab 160 may be preferred for various reasons at least including the requisite image processing, an imaging device 304 located on the rear tower of a work vehicle 100 such as a conventional small-frame skid steer loader can be provided and utilized according to the present disclosure without encountering the partially obscured vision or auxiliary telescoping arm of alternative solutions.

For either of the embodiments of a work vehicle 100 as represented in FIG. 1 or 2, a further solution as disclosed herein includes mounting an imaging device 304 on the boom assembly 170 itself. In certain embodiments it may be preferable to locate the imaging device 304 atop the lift arm 190 such that the imaging device 304 remains as close to a central location relative to the operator cab 160 as possible throughout the available trajectory of movement of the lift arm 190.

In the above-referenced embodiments wherein the work vehicle 100 is a skid steer or compact track loader, a first portion of the work vehicle 100 may be defined as including the main frame 110 whereas a second portion of the work vehicle includes at least the boom assembly 170 which is supported from and moveable relative to the frame 110. In various alternative embodiments as previously noted (not shown in the figures), the work vehicle 100 may be an excavator, a crawler dozer, an articulated dump truck, or the like. In the case of an excavator, for example, the first portion of the work vehicle 100 includes the frame supporting the operator cab while the second portion includes the boom assembly supported by the frame but forwardly and centrally extending, such that the boom assembly obscures visibility from a different perspective than with the compact track loader, for example. As another non-limiting example, the imaging device may for example be mounted on either portion of an articulating vehicle such as a dump truck.

Figure 3:
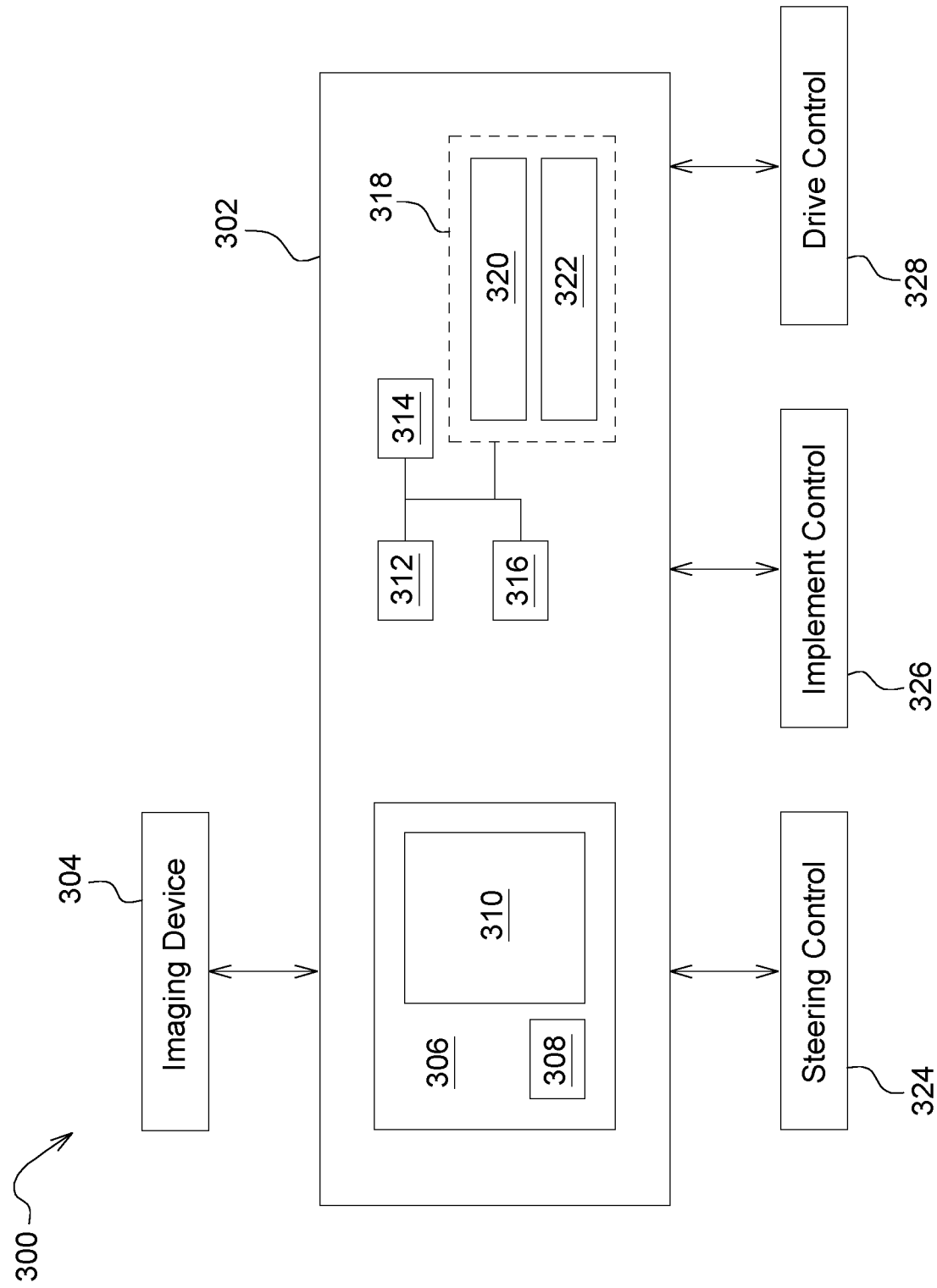
FIG. 3 is a graphical diagram representing an exemplary control system for a work vehicle of the present disclosure.

As schematically illustrated in FIG. 3, the work vehicle 100 includes a control system 300 including a processing unit, which may be embodied by or otherwise include a work vehicle controller 302. The controller 302 may be part of the vehicle control unit, or it may be a separate control module. The controller 302 may include the user interface 306 and optionally be mounted in the operators cab 160 at a control panel. In certain embodiments within the scope of the present disclosure, the processing unit may include one or more processors located remotely with respect to the work vehicle, or independently with respect to the work vehicle such as for example a mobile device.

The controller 302 is configured to receive input signals from an imaging device 304. The output signals from the imaging device 304 may be provided directly to the controller 302 or for example via intervening components for analog-to-digital conversion and/or video interface (not shown). Certain additional sensors (not shown) may be functionally linked to the controller 302 and provided to detect vehicle operating conditions and/or kinematics. In an embodiment, at least one kinematics sensor such as a rotary sensor may be provided for tracking a position of the imaging device 304 relative to a predetermined area of interest 340.

In a particular exemplary embodiment, vehicle kinematics sensors for tracking a position of the imaging device 304 relative to a predetermined area of interest 340 may be provided in the form of inertial measurement units (each, an IMU) integrated within the imaging device 304 and/or separately mounted on at least the frame 110 of the work vehicle 100, and further on the lift arm 190 or other relevant component upon which the imaging device 304 is mounted. IMUs include a number of sensors including, but not limited to, accelerometers, which measure (among other things) velocity and acceleration, gyroscopes, which measure (among other things) angular velocity and angular acceleration, and magnetometers, which measure (among other things) strength and direction of a magnetic field. Generally, an accelerometer provides measurements, with respect to (among other things) force due to gravity, while a gyroscope provides measurements, with respect to (among other things) rigid body motion. The magnetometer provides measurements of the strength and the direction of the magnetic field, with respect to (among other things) known internal constants, or with respect to a known, accurately measured magnetic field. The magnetometer provides measurements of a magnetic field to yield information on positional, or angular, orientation of the IMU; similarly to that of the magnetometer, the gyroscope yields information on a positional, or angular, orientation of the IMU. Accordingly, the magnetometer may be used in lieu of the gyroscope, or in combination with the gyroscope, and complementary to the accelerometer, in order to produce local information and coordinates on the position, motion, and orientation of the IMU.

In another embodiment, non-kinematic sensors may be implemented for position detection, such as for example markers or other machine-readable components that are mounted or printed on the work vehicle 100 and within the field of view of the imaging device 304. In one example, April tags or an equivalent may be provided such that, depending on how the marker appears within the field of view of the imaging device 304, data processing elements may calculate a distance to the marker and/or orientation of the marker relative to the imaging device 304 for spatially ascertaining the position of the imaging device 304. As another example, machine learning techniques may be implemented based on inputs for two or more known components of the work vehicle 100 such as a front cab mount and a rear mudguard, such that the data processing units can spatially ascertain a position of the imaging device 304 based on a distance between the two or more components and their respective positions in the field of view of the imaging device 304.

Other sensors functionally linked to the controller 302 which may optionally be provided for functions as described herein or otherwise may include for example global positioning system (GPS) sensors, vehicle speed sensors, ultrasonic sensors, laser scanners, radar wave transmitters and receivers, thermal sensors, imaging devices, structured light sensors, and other optical sensors, and whereas one or more of these sensors may be discrete in nature a sensor system may further refer to signals provided from a central machine control unit.

The imaging device 304 may include video cameras configured to record an original image stream and transmit corresponding data to the controller 302. In the alternative or in addition, the imaging device 304 may include one or more of a digital (CCD/CMOS) camera, an infrared camera, a stereoscopic camera, a PMD camera, high resolution light detection and ranging (LiDAR) scanners, radar detectors, laser scanners, and the like within the scope of the present disclosure. The number and orientation of said imaging devices 304 or respective sensors may vary in accordance with the type of work vehicle 100 and relevant applications, but may at least be provided with respect to a field of view 330 alongside the work vehicle 100 and configured to capture data associated with lateral surroundings and associated objects proximate thereto.

In an embodiment, the imaging device 304 may include an ultra-wide-angle lens (e.g., a "fish-eye" lens) having a sufficiently broad field of view to capture an area of interest 340 at any position along an available trajectory of movement (if any) of a component upon which the imaging device 304 is mounted, and to provide image data comprising the area of interest projected on a plane for image data processing functions as further described elsewhere herein.

In an embodiment, the imaging device 304 may be provided with a zoom lens such that the field of view and correspondingly the output image data from the imaging device 304 compensates for movement of the position of the imaging device relative to the area of interest. Such an embodiment may eliminate or at least reduce the need for data processing downstream of the imaging device to resize the field of view.

In another embodiment, it may be contemplated that a single imaging device 304 may be utilized but provided with a moveable/rotatable mount such that the field of view is dynamic to correspond with an area of interest throughout movement (if any) of the component upon which the imaging device 304 is mounted. In yet another embodiment, a plurality of imaging devices 304 may be provided such that selection of a given imaging device and its corresponding field of view may be implemented to optimize the image data for an area of interest.

It may of course be understood that one or more of the preceding embodiments with respect to the imaging device 304 may be combined to provide corresponding features for a method as described below. For example, a zoom lens may be provided along with a panning base such that the imaging device is continuously directed to the same area of interest throughout movement (if any) of the element of the work vehicle 100 to which the imaging device is mounted.

One of skill in the art may appreciate that image data processing functions may be performed discretely at a given imaging device if properly configured, but most if not all image data processing may generally be performed by the controller 302 or other downstream data processor. For example, image data from any one or more imaging devices 304 may be provided for three-dimensional point cloud generation, image segmentation, object delineation and classification, and the like, using image data processing tools as are known in the art in combination with the objectives disclosed.

The controller 302 of the work vehicle 100 may be configured to produce outputs, as further described below, to a user interface 306 associated with a display unit 310 for display to the human operator. The controller 302 may be configured to receive inputs from the user interface 306, such as user input provided via the user interface 306. Not specifically represented in FIG. 3, the controller 302 of the work vehicle 100 may in some embodiments further receive inputs from and generate outputs to remote devices associated with a user via a respective user interface, for example a display unit with touchscreen interface. Data transmission between for example the vehicle control system and a remote user interface may take the form of a wireless communications system and associated components as are conventionally known in the art. In certain embodiments, a remote user interface and vehicle control systems for respective work vehicles may be further coordinated or otherwise interact with a remote server or other computing device for the performance of operations in a system as disclosed herein.

The controller 302 may be configured to generate control signals for controlling the operation of respective actuators, or signals for indirect control via intermediate control units, associated with a machine steering control system 324, a machine implement control system 326, and/or a machine drive control system 328. The controller 302 may for example be electrically coupled to respective components of these and/or other systems by a wiring harness such that messages, commands, and electrical power may be transmitted between the controller 302 and the remainder of the work vehicle 100. The controller 302 may be coupled to other controllers, such as for example the engine control unit (ECU), through a controller area network (CAN), and may then send and receive messages over the CAN to communicate with other components of the CAN.

The controller 302 may include or be associated with a processor 312, a computer readable medium 314, a communication unit 316, data storage 318 such as for example a database network, and the aforementioned user interface 306 or control panel 306 having a display 310. An input/output device 308, such as a keyboard, joystick or other user interface tool, is provided so that the human operator may input instructions to the controller. It is understood that the controller described herein may be a single controller having all of the described functionality, or it may include multiple controllers wherein the described functionality is distributed among the multiple controllers.

Various operations, steps or algorithms as described in connection with the controller 302 can be embodied directly in hardware, in a computer program product such as a software module executed by the processor 312, or in a combination of the two. The computer program product can reside in RAM memory, flash memory, ROM memory, EPROM memory, EEPROM memory, registers, hard disk, a removable disk, or any other form of computer-readable medium 314 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 312 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 316 may support or provide communications between the controller and external systems or devices, and/or support or provide communication interface with respect to internal components of the work vehicle. The communications unit may include wireless communication system components (e.g., via cellular modem, WiFi, Bluetooth or the like) and/or may include one or more wired communications terminals such as universal serial bus ports.

The data storage 318 in an embodiment may be configured to at least receive and store real-time and/or historical data sets regarding machine parameters 320 and real-time and/or historical data sets regarding image data parameters 322 in selectively retrievable form, for example as inputs for developing models as further described herein for correlating positions of the boom assembly and an imaging device mounted thereon with respective portions of captured images in a field of view for the imaging device. Data storage as discussed herein may, unless otherwise stated, generally encompass hardware such as volatile or non-volatile storage devices, drives, memory, or other storage media, as well as one or more databases residing thereon.

For example, by reference now to FIGS. 4-9, in an embodiment an imaging device 304 is mounted on the lift arm 190 of the boom assembly 170 of a work vehicle 100 such that a field of view 330 for the imaging device 304 includes at least the entirety of an area of interest 340 throughout an available trajectory of movement for the boom assembly 170. As represented in FIG. 7, the boom assembly 170 and accordingly the imaging device 304 are at a lowest available position (as further represented in FIG. 4), and the predetermined area of interest 340 takes up a proportionately large portion of the field of view 330 but is entirely captured thereby. As represented in FIG. 8, the boom assembly 170 and accordingly the imaging device 304 are at an intermediate position along the available trajectory of movement (as further represented in FIG. 5), and the predetermined area of interest 340 takes up a smaller portion of the field of view 330 and is still entirely captured thereby. Finally, as represented in FIG. 9 the boom assembly 170 and imaging device 304 are elevated to a highest available position (as further represented in FIG. 6), and the predetermined area of interest 340 takes up an even smaller portion of the field of view 330.

As the lift arm 190 and the imaging device 304 are raised along the available trajectory of movement, these components do not merely elevate but also pivot relative to the ground surface 135. Accordingly, in various embodiments the imaging device 304 is not merely mounted directly over the area of interest 340 and point downward, but may be positioned and oriented so as to capture the area of interest 340 throughout the pivoting motion of the boom assembly 170, even if this means that the area of interest 340 starts in one portion of the field of view 330 and ends up in another portion of the field of view 330. The imaging device 304 may need to be selected based on the type of work vehicle 100 and/or desired area of interest to have a sufficiently wide angle for its field of view, depending for example on the amount of available movement for the boom assembly 170.

It may be appreciated that the position and size of the viewing area 330 recorded by a respective imaging device 304 may typically depend on the arrangement and orientation of the camera on the frame 110 or boom assembly 170 and further on the camera lens system, in particular the focal length of the lens of the camera.

The positions and sizes of the viewing areas in FIGS. 7-9 should accordingly only be considered as exemplary, as they will vary for any number of parameters in a particular implementation.

Figure 10:
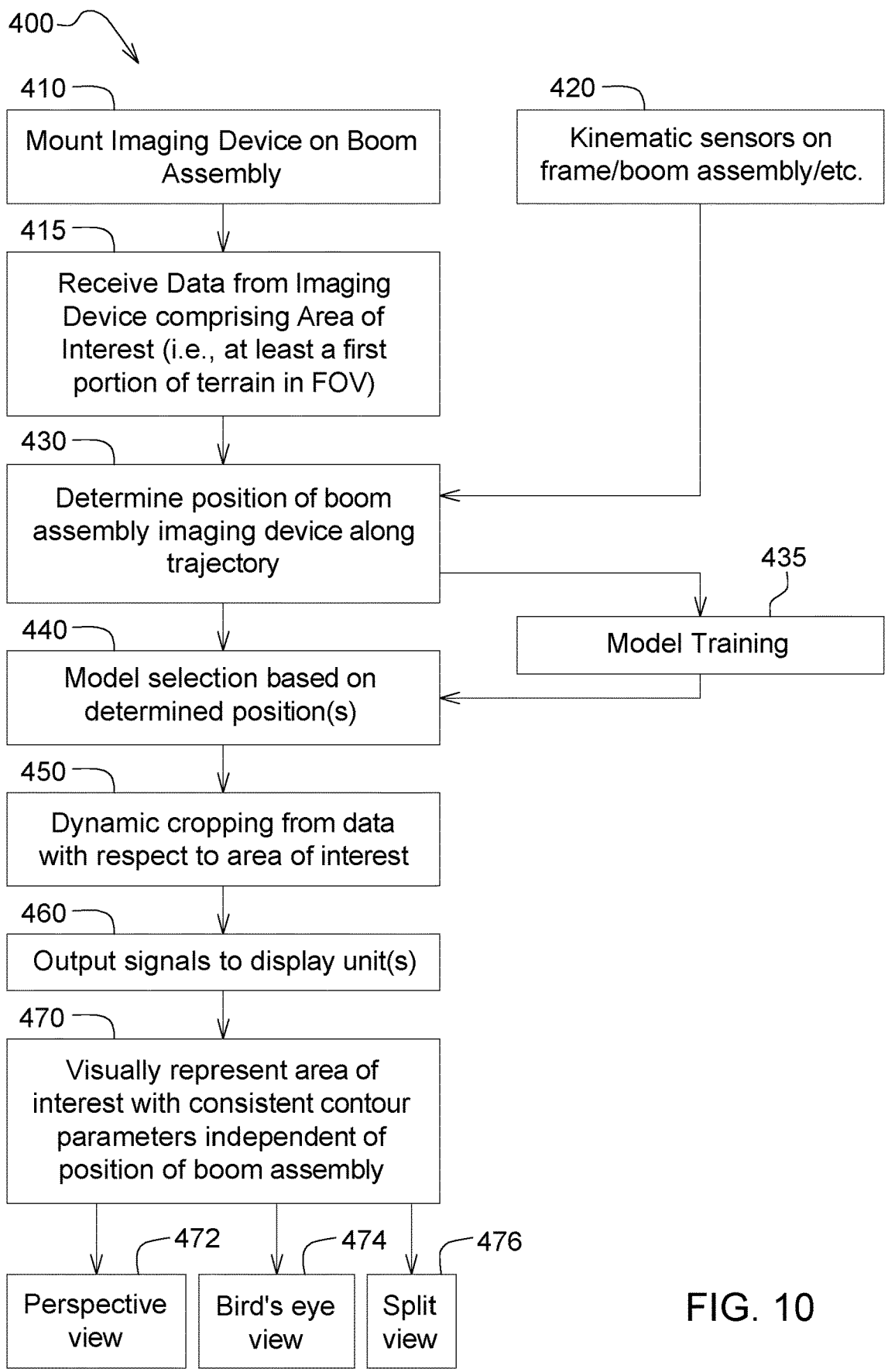
FIG. 10 is a flowchart representing an exemplary method according to the present disclosure.

Referring next to FIG. 10, an exemplary method 400 of visually representing at least a portion of terrain proximate to a work vehicle 100 may now be described, more particularly with respect to an embodiment as previously discussed wherein the imaging device 304 is mounted (step 410) on the boom assembly 170 of such a work vehicle 100. As previously noted, the imaging device 304 is preferably mounted such that data received from the imaging device 304 (step 415) and corresponding to a field of view 330 of the imaging device includes at least a predetermined area of interest 340 at all times throughout an available trajectory of movement for the boom assembly 170.

In an embodiment, input data from the imaging device 340 is processed to generate output signals corresponding to a representative display of the area of interest 340 to a display unit 310, wherein image display parameters associated with perimeter contours of the area of interest 340 are substantially maintained throughout the available trajectory of movement of the boom assembly 170. In other words, as the boom assembly 170 is raised from an initial (i.e., lowest) position to a highest position, the area of interest 340 would comprise a progressively smaller proportion of the overall field of view 330, whereas it is desired in such an embodiment to maintain a consistent display of the contours of the area of interest throughout such movement.

While an area of interest 340 as represented in FIGS. 7-9 may include rectangular boundaries, it may be understood that boundaries of an area of interest may take numerous alternative forms including for example a polygon, an ellipse, a circle, or the like.

To facilitate such image processing, the method 400 may include receiving input signals from one or more kinematic sensors on the frame 110, boom assembly 170, and the like, and/or input signals from other components such as for example a central vehicle control unit or user interface, for the purpose of determining a position of the boom assembly 170 and the corresponding position of the imaging device 304 as it travels along its available trajectory of movement (step 430). In an embodiment, models may be iteratively developed and trained over time (step 435) so as for example to correlate respective identified positions of the boom assembly 170, etc., with respect to contours of a predetermined area of interest 340. In some cases, the area of interest 340 may be selectable or otherwise adjustable by users, wherein alternative or additional models may be trained to provide appropriate corresponding image processing factors for a given position. Sufficiently trained models may then be retrievably selected for use based on a determined position in real time (step 440) for dynamic image processing and compensation.

In an embodiment of the method 400 as represented in FIG. 10, the dynamic image compensation of the input data comprises dynamic cropping and resizing of the raw input data (step 450) from the field of view 330 of the imaging device 340 and with respect to the area of interest 340. The image processing techniques may further include geometric and spatial translation of the input data via an appropriate model selected based on the determined current position of the imaging device 304. For example, mapping functions may be utilized to address varying orientations of the imaging device 304 and the corresponding field of view 330 and the requisite projective transformations to maintain a common viewing plane for display to users.

One of skill in the art may appreciate that additional image processing techniques may be employed to address visual distortions in the raw image data. For example, for imaging devices 304 including ultra-wide-angle lenses the resultant image data may include barrel distortion effects dependent at least in part on the relative position of the area of interest 340 within the overall field of view, such that the area of interest appears to be larger when it is central to the field of view and smaller when it is more peripheral with respect to the field of view.

Exemplary algorithms associated with one or more of the aforementioned image processing techniques may in certain embodiments be developed and improved over time for particular positions and orientations of the imaging device 304 as part of the model development and training process, wherein processing requirements and the potential for error may desirably be minimized for subsequent iterations of the method.

In step 460 of the method 400, output signals are generated to one or more display units, including for example an onboard display unit 310 in the operator cab 160, wherein each such display unit may be configured to visually represent the area of interest 340 with consistent contour parameters independent of the actual position of the boom assembly 170 relative to its available trajectory of movement. In other words, in at least a first configuration for the display unit, which may for example be selectable by a user, the contours of the area of interest 340 remain substantially unchanged relative to a portion of the display even though the imaging device 304 itself has been raised or lowered, with the area of interest 340 taking up a proportionately smaller or larger portion of the field of view 330 for the imaging device 304 but importantly being retained as the area of interest regardless of its relative positioning with the overall field of view.

The image processing and corresponding output signals to the display unit according to at least the represented embodiment may further enable user selection from among a plurality of display views. For example, the user may be able to select a perspective view of the area of interest (step 472). As another example, the user may be able to select an overhead view (also referred to herein as a top down view or a so-called "bird's eye" view) which includes at least the area of interest (step 474) and may for example include output signals corresponding to at least imaging devices 304 on opposing sides of the work vehicle 100 and stitched together to form a single display. As another example, the user may be able to select a split view (step 476) including the area of interest 340 in at least a first portion of the display. In embodiments wherein a first imaging device 304 is provided on the boom assembly 170 on a first (e.g., left) side of the work vehicle 100 and a second imaging device 304 is provided on the boom assembly 170 on a second (e.g., right) side of the work vehicle 100, a split view may enable display of a respective area of interest for each of the left and right sides in respective portions of the display, and/or an overhead view may enable display of both respective areas of interest on a single portion of the display.

Thus it is seen that an apparatus and/or methods according to the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments, unless otherwise specifically stated.

What is claimed is:

1. A work vehicle comprising:
   a first portion comprising a frame supported by a plurality of ground engaging units;

an operator cab supported by the frame and having a first side having a forward field of view, and opposing second and third sides having respective lateral fields of view;

a second portion moveable relative to the first portion, the second portion including a boom assembly having first and second lift arms coupled to the frame, the first lift arm positioned adjacent to the second side of the operator cab, the second lift arm positioned adjacent to the third side of the operator cab;

wherein a predetermined area of interest corresponding to at least a first portion of terrain relative to the frame is obscured via one or more of forward field of view and/or the lateral fields of view by the second portion during at least part of a trajectory of movement of the second portion; and a first and second imaging devices, the first imaging device mounted on the first lift arm and the second imaging device mounted on the second lift arm, at least one of the first and second imaging devices having a field of view including the at least first portion of the terrain throughout the trajectory of movement of the second portion of the work vehicle.

2. The work vehicle of claim 1, wherein the boom assembly is supported by the frame and configured to selectively move a working tool at a distal end thereof between a ground engaging position and a maximum elevated position at opposing ends of the trajectory of movement.

3. The work vehicle of claim 1, wherein the at least first portion of terrain proximate to the frame is obscured via one or more of the lateral fields of view from the operator cab by the boom assembly during at least a portion of the trajectory of movement of the boom assembly.

4. The work vehicle of claim 1, wherein the work vehicle comprises an excavator and the at least first portion of terrain proximate to the frame is obscured via the forward field of view from the operator cab by the boom assembly during at least a portion of the trajectory of movement of the boom assembly.

5. The work vehicle of claim 1, further comprising a controller in functional communication with the first and second imaging devices to receive image data therefrom, wherein the controller is configured to generate output signals corresponding to images of the at least first portion of the terrain to a display unit.

6. The work vehicle of claim 5, wherein the display unit is provided in the operator cab.

7. The work vehicle of claim 5, wherein the controller is configured to process the image data and generate the output signals for producing an image comprising a top down view of the at least first portion of the terrain.

8. The work vehicle of claim 7, wherein the controller is configured to dynamically process the image data, wherein image display parameters associated with the at least first portion of the terrain are maintained throughout the trajectory of movement of the second portion.

9. The work vehicle of claim 8, wherein the controller is configured to dynamically process the image data based on a current position of the imaging device along the trajectory of movement of the second portion.

10. The work vehicle of claim 9, further comprising one or more kinematic sensors located on the work vehicle and linked to the controller, wherein the controller is configured to determine the current position of at least one of the first and second imaging devices in a local reference system via at least signals from the one or more kinematic sensors.

11. The work vehicle of claim 10, wherein the one or more kinematic sensors are integrated in at least one of the first and second imaging devices.

12. The work vehicle of claim 10, wherein the one or more kinematic sensors comprise a first position sensor mounted on the first portion of the work vehicle and a second position sensor mounted on the second portion of the work vehicle.

13. The work vehicle of claim 8, wherein the dynamic processing of the image data comprises dynamic cropping of the image data from the field of view of a corresponding one of the first and second imaging devices and with respect to the at least first portion of the terrain.

14. The work vehicle of claim 13, wherein the dynamic cropping of the image data is achieved at least in part via retrieval and implementation of one or more models corresponding to a current position of the corresponding one of the first and second imaging devices along the trajectory of movement of the second portion.

15. The work vehicle of claim 14, further comprising one or more kinematic sensors located on the work vehicle and linked to the controller, wherein the controller is configured to determine the current position of the corresponding one of the first and second imaging devices in a local reference system via at least signals from the one or more kinematic sensors.

16. The work vehicle of claim 15, wherein the one or more kinematic sensors are integrated with the corresponding one of the first and second imaging device.

17. The work vehicle of claim 16, wherein the one or more kinematic sensors comprise a first position sensor mounted on the first portion of the work vehicle and a second position sensor mounted on the second portion of the work vehicle.

* * * * *